July 27, 1965 K. A. BRANDENBERG 3,196,890
DOUBLE ACTING CHECK VALVE
Filed Nov. 28, 1961

INVENTOR
KARL A. BRANDENBERG
BY
Gardner & Zimmerman
ATTORNEYS

United States Patent Office 3,196,890
Patented July 27, 1965

3,196,890
DOUBLE ACTING CHECK VALVE
Karl A. Brandenberg, San Leandro, Calif., assignor to Modernair Corporation, San Leandro, Calif., a corporation of California
Filed Nov. 28, 1961, Ser. No. 155,319
7 Claims. (Cl. 137—102)

This invention relates to check valves in general, and is particularly directed to a double acting check valve of improved design for controlling fluid flow between either of a pair of independent ports and a common port.

Double acting check valves are known which are arranged to control the flow of fluid between either of a pair of independent ports and a common port depending on the pressure differentials established between the various ports. More particularly, a check member such as a diaphragm is disposed within the valve body between the independent ports and between each of the independent ports and a passage communicating with the common port. The check member is arranged to, in one position, block communication between one independent port and the common port while establishing communication between the other independent port and the common port. In another position the check member reverses these communication conditions between the independent ports and common port. The two positions of the check member are determined by the pressure differential thereacross which in turn depends upon the fluid pressure at each of the independent ports and at the common port.

Heretofore double acting check valves of the foregoing type have been relatively complex in their construction. In some instances peripherally clamped diaphragm check members of rather elaborate design have been required to facilitate the desired pressure differential actuated flow control. In other instances relatively complex and difficult to fabricate backing structure is required incorporated within the independent ports to prevent a very thin diaphragm check member from being sucked into the ports or being ruptured by the otherwise unsupported pressure differentials thereacross.

It is therefore an object of the present invention to provide an improved double acting check valve of relatively simple and easily manufactured construction.

Another object of the invention is the provision of a check valve of the class described wherein the check member is a simple freely supported flexible disc and no backing support structure is required in the ports.

It is a further object of the invention to provide an extremely rugged self-contained valve of the class described which is capable of providing fast full-flow connection of fluid from either one of two sources, but not between the sources and can therefore function as both a quick exhaust valve and a double check valve.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
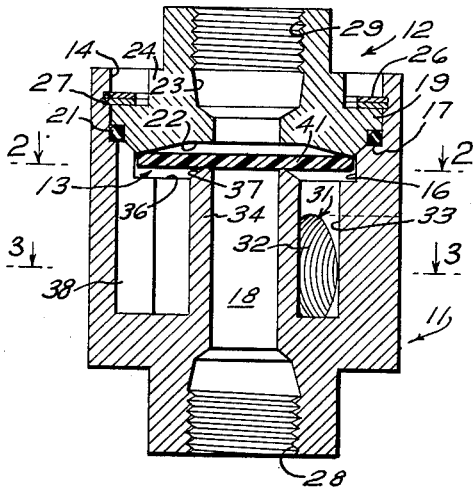
FIGURE 1 is a diametric sectional view of a valve in accordance with the present invention with the check disc in horizontal unactuated position.

Referring now to the drawing there is shown a double acting check valve in accordance with the present invention which includes a valve body 11 and valve cover 12. The body is preferably cylindrical and has a concentric recess 13 formed in one end face. Recess 13 includes an enlarged outer end portion 14 inwardly stepped to a reduced inner end portion 16, an annular shoulder 17 being thus defined between the outer and inner recess portions. In addition a bore 18 extends coaxially through the body.

The enlarged outer end portion 14 of the recess 13 serves to receive the valve cover 12 which is of cylindrical plug configuration. More particularly, the cover is preferably formed with an annular flange 19 adapted to concentrically fit recess portion 14 and abut the shoulder 17 with an annular sealing element 21 interposed therebetween. The inner end of flange 19 is formed with a central dished out recess 22 defining a dished out closure to recess portion 16. In addition an axial bore 23 extends through the cover and terminates in the dished out recess 22. When the cover is secured in position within the body, bores 18 and 23 are thus coaxially aligned.

In order that the cover may be readily secured within the body, the cover preferably includes an inwardly stepped outer end portion 24 extending coaxially outward from the flange 19. A snap ring 26 concentrically disposed about end portion 24 and engaging a circumferential groove 27 in the wall of recess portion 14 then facilitates securance of the cover within the body.

Bores 18 and 23 define the independent ports of the valve of the present invention and are therefore preferably internally threaded at their outer ends as indicated at 28, 29 to facilitate attachment of fluid sources thereto.

A common port is also provided in the valve body 11. Such port is defined by a radial bore 31 in the outer periphery of the body which terminates short of bore 18. The bore 31 is likewise preferably internally threaded at its outer end as indicated at 32 to facilitate ready connection to a fluid system.

Figure 2:
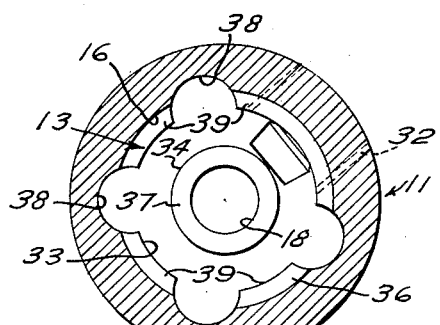
FIGURE 2 is a sectional view taken at line 2—2 of FIGURE 1.
Figure 3:
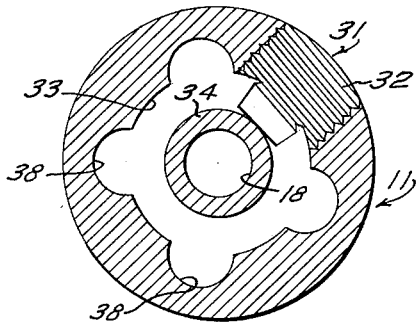
FIGURE 3 is a sectional view taken at line 3—3 of FIGURE 1.

To facilitate communication between the independent ports defined by bores 18, 23 and the common port defined by bore 31, an annular channel 22 extends coaxially to the base of lower recess portion 16 and into communication with bore 31. The channel is inwardly radially spaced from the base termination of the peripheral wall of recess portion 16 and outwardly radially spaced from the peripheral wall of bore 18. An upstanding bushing 34 is thus defined concentrically between the channel and bore 19 and this bushing is dimensioned to extend axially beyond the base of recess portion 16. In addition an annular shoulder 36 is defined at the base of the recess portion concentrically about the opening to the channel and radially spaced from the projecting tip of the bushing. It is particularly important to note that the rim surface 37 of the bushing is axially displaced from shoulder 36 in the direction of the valve cover 12. Moreover, the outer wall of channel 33 is provided with a plurality of circumferentially spaced flutes 38 extending axially from the shoulder 36 towards the base of the channel. The radial depth of the flutes is greater than the radial thickness of the shoulder. The shoulder is hence not continuous but defined by a plurality of radially projecting annular segments 39 circumferentially interposed between the flutes. This form of the shoulder is best illustrated in FIGURE 2. It is particularly important to note that the outer circumference of shoulder segments 39 is inwardly radially spaced from the points of maximum depth of the flutes.

To complete the valve of the present invention, a check disc 41 of neoprene or equivalent pliant material is coaxially disposed within recess portion 16 between shoulder 36 and the inner end face of the valve cover 12. The diameter of the disc is substantially equal to that of recess portion 16, viz., the outer diameter of shoulder 36. The thickness of the disc is selected substantially equal the axial distance between rim surface 37 and the inner end face of the cover 12 at its periphery. This thickness, moreover, is sufficient to preclude sucking of the disc into the bores 18, 23 or rupture of the disc when a pressure differential is established thereacross. When no pressure differential exists across the disc it is horizontally disposed as shown in FIGURE 1 freely supported by the periphery of the inner end face of the valve cover. In this position the central portion of the disc is spaced from the base of dished out recess 22 and the rim surface 37 abuts the disc. In addition the outer peripheral portions of the face of the disc spaced from channel 33 and shoulder 36. It is particularly important to note that the rim surface 37 and dished out recess 22 function as opposed valve seats for the disc 41 for selectively closing the independent ports defined by bores 18 and 23. The shoulder 36 likewise functions as a peripheral seat for the disc in controlling communication between the bores 18, 22 and channel 33 and therefore between the independent ports and common ports.

Figure 4:
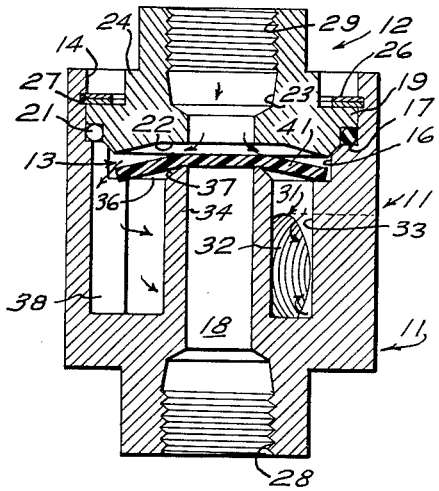
FIGURE 4 is a view similar to FIGURE 1 but with the check disc in actuated position to establish communication between a first independent port and a common port while blocking communication between a second independent port and common port and between the independent ports.
Figure 5:
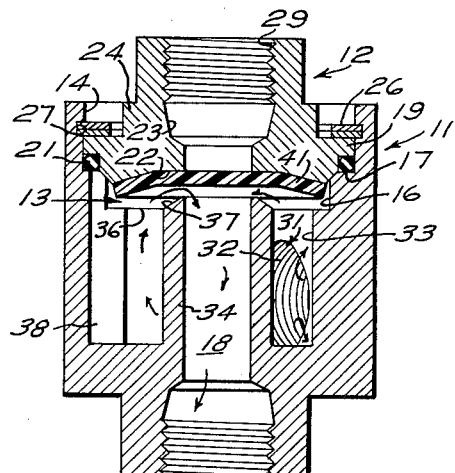
FIGURE 5 is a view similar to FIGURES 1 and 2 but with the check disc in actuated position to establish communication between the second independent port and common port while blocking communication between the second independent port and common port and between the independent ports.

In the operation of the valve physically described hereinbefore, consider the valve employed as a quick release exhaust valve with the bore 23 communicably connected to a controlled pressurized fluid source and bore 31 communicably connected to the upper portion of a fluid actuated cylinder. In this case bore 23 thus functions as an inlet port while bore 18 functions as an exhaust port. With pressure applied to bore 23, the pressure differential across disc 41 deforms same to the configuration depicted in FIGURE 4. More specifically the disc is centrally urged into pressure sealed engagement with rim surface 37 to thus close bore 18. The peripheral portions of the disc are bent downwardly into engagement with shoulder segments 39. Inasmuch as the depth of flutes 36 is greater than the radial thickness of the segments 39 and the disc periphery is now seated thereon, a path of communication is established from bore 23, through flutes 36 to channel 33, and therefore to bore 31 as depicted by the arrows in the figure. The fluid from the source is thus applied through the valve to the fluid actuated cylinder to initiate a driving stroke of its associated piston. When the controlled pressure source is actuated to remove the fluid from bore 31, the pressure of fluid in the cylinder establishes a pressure differential across the disc in the opposite direction. The disc is now deformed as indicated in FIGURE 5. More particularly the fluid entering bore 31 and extending into the channel 33 urges the disc against the dished out recess 22. The disc is conformed to the recess configuration and hence closes bore 23. Moreover the disc is now pulled away from rim surface 37. A path of communication is thus established between channel 33 and bore 18 with the fluid applied to bore 31 being thus exhausted through bore 18.

In another application of the valve as a double check valve, two independent fluid supplies are respectively connected to bores 18, 23 while bore 31 is connected to a common outlet line. When the pressure of fluid applied to bore 23 exceeds that applied to bore 18, the valve functions as previously described and illustrated in FIGURE 4. The pressure differential across the disc 41 is such as to deform same in the manner depicted in the figure and establish communication between bores 23 and 31. When the fluid pressure at bore 18 exceeds that at bore 23, the pressure differential deforms the disc in the manner depicted in FIGURE 5. Communication is thus established between bores 18 and 31.

What is claimed is:

1. A valve comprising body means defining first and second coaxial aligned bores terminating respectively at opposed spaced first and second valve seats, said means defining an annular channel concentrically disposed about said first bore and outwardly spaced therefrom with an annular third valve seat circumferentially disposed about said channel and axially spaced from said first valve seat in a direction away from said second valve seat, said third valve seat being disposed radially outwardly from said channel in radially spaced relation with said first valve seat, said means defining a third bore communicating with said channel, said means defining a path of communication radially outward from said third valve seat between said channel and the space between said first and second valve seats, and a pliable disc coaxially disposed in said space between said first and second valve seats and having a diameter larger than the inner diameter of said third annular valve seat.

2. A valve comprising a body having an annular recessed channel disposed concentrically about an axial bore and defining a bushing therebetween, said channel having a circumferential annular shoulder disposed radially outwardly of said channel with the end face of said bushing projecting axially beyond said shoulder, said channel having axial flutes with radial depths greater than the radial thickness of said shoulder, said body having a second bore communicating with said channel, means defining a closure across said channel and axially spaced from said shoulder and the end face of said bushing, said closure having a central bore aligned with said first bore and terminating in a dished out recess having a diameter substantially equal that of said shoulder, and a pliable disc disposed coaxially within the space between said closure and said shoulder and adapted to have a central position abut the end face of said bushing, said disc having a diameter larger than the inner diameter of said annular shoulder.

3. A valve according to claim 2, further defined by said disc having a thickness equal to the axial distance between said end face of said bushing and the peripheral face portions of said closure.

4. A valve comprising a cylindrical body having a cylindrical recess in one end face and an axial bore communicating with the recess, said recess having an enlarged outer portion and inwardly stepped inner portion thereby defining a shoulder therebetween, said body having an annular channel extending axially from the base of said inner portion concentrically outward from said bore and defining a bushing therebetween, said channel spaced radially inward from the periphery of said inner portion to define a second shoulder disposed circumferentially outwardly of said channel at the base of said inner portion and in radially spaced relation to said bushing, said bushing projecting axially beyond said second shoulder to a position short of said first shoulder, said channel having a plurality of circumferentially spaced flutes extending axially from said second shoulder with the radial depth of said flutes exceeding the radial thickness of said second shoulder, said body having a radial bore communicating with said channel, a cylindrical cover secured within said outer portion of said recess and engaging said first shoulder in sealed relation thereto, said cover having a central dished out recess in its inner end face spaced from said bushing and an axial bore extending externally from said dished out recess, and a pliable disc coaxially disposed within the space between said inner end face of said cover and said bushing and second shoulder, said disc having a diameter substantially equal the outer diameter of said second shoulder.

5. A valve according to claim 4, further defined by said disc having a thickness equal to the axial distance between the end face of said bushing and the outer peripheral portions of the inner end face of said cover.

6. A valve comprising a valve element having opposed sides, means defining a first passage terminating in a first valve seat disposed adjacent a first portion of one side of said element and adapted for engagement therewith, means defining a second passage terminating in a second valve seat disposed adjacent a second portion of said one side of said element and adapted for engagement therewith, said second valve seat being spaced axially from said first seat in a direction away from said element, means defining a third passage terminating in a third valve seat disposed adjacent a portion of the opposite side of said element and adapted for engagement therewith, and means defining a path between said second and third passages when said element is engaged with said first and second seats.

7. A valve comprising body means defining first and second coaxial aligned bores terminating respectively at opposed spaced first and second valve seats, said means defining an annular channel disposed about said first bore and outwardly spaced therefrom with an annular third valve seat disposed radially outwardly of said channel in spaced relation with said first valve seat, said means defining a third bore communicating with said channel, a disc coaxially disposed in said space between said first and second valve seats and having a diameter larger than the inner diameter of said annular valve seat, and means defining a path of communication between said channel and said second bore when said disc is in engagement with said first and third valve seats.

References Cited by the Examiner
UNITED STATES PATENTS

| | | | |
|---|---|---|---|
| 2,284,051 | 5/42 | Gilbert | 137—217 |
| 2,594,999 | 4/52 | Robinson | 137—218 |
| 2,875,776 | 3/59 | Skipwith | 137—218 |

ISADOR WEIL, *Primary Examiner.*